July 28, 1936.　　　J. G. MOXEY　　　2,049,132
SEMITRAILER TANK TRUCK
Filed July 19, 1934
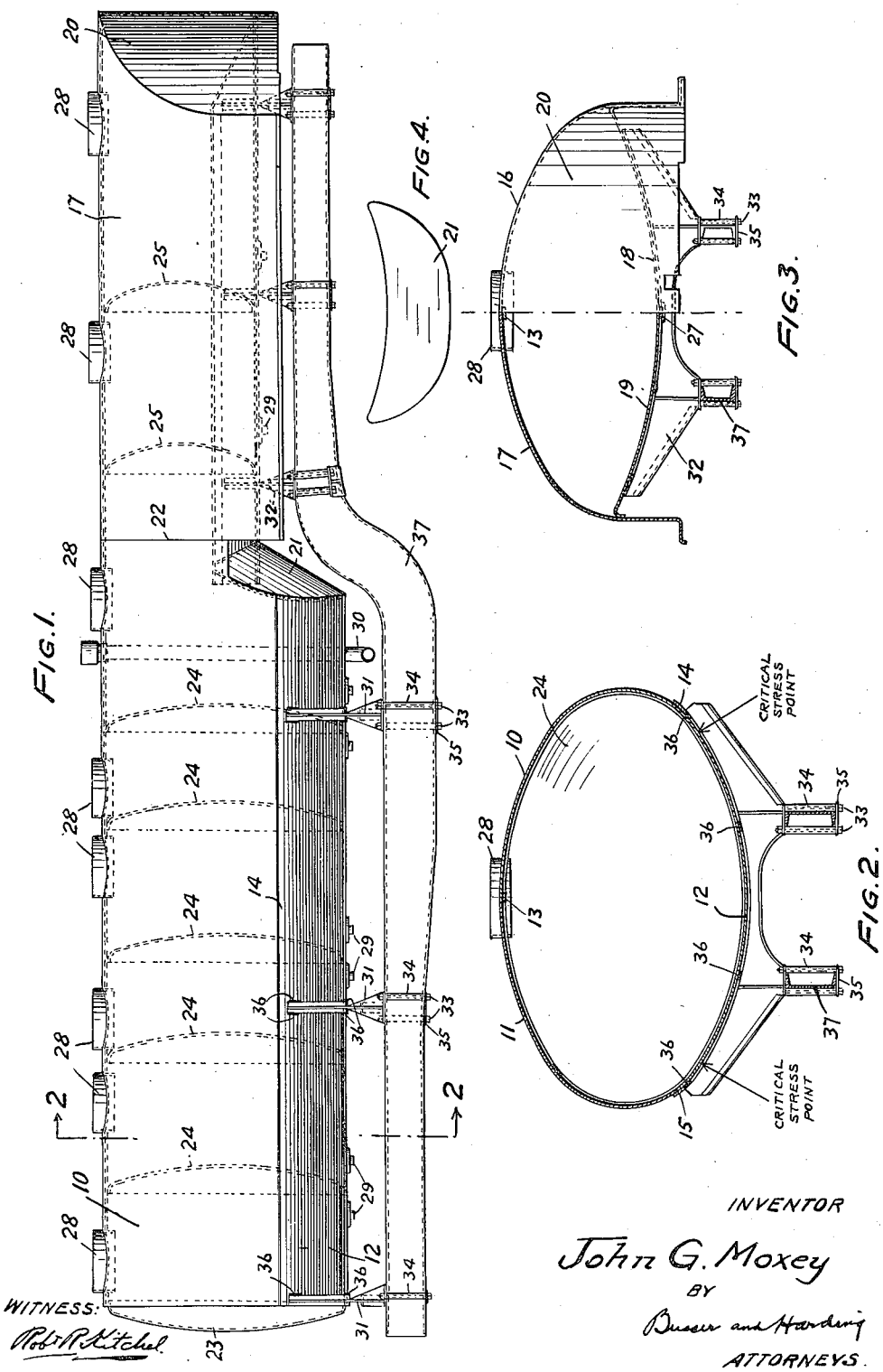
INVENTOR
John G. Moxey
BY
Busser and Harding
ATTORNEYS.

Patented July 28, 1936

2,049,132

UNITED STATES PATENT OFFICE 2,049,132

SEMITRAILER TANK TRUCK

John G. Moxey, Philadelphia, Pa., assignor to Sun Oil Company, Philadelphia, Pa., a corporation of New Jersey Application July 19, 1934, Serial No. 735,961

4 Claims. (Cl. 280—5)

The present invention relates to an improvement in tank trucks and more particularly to trucks of the semitrailer type having a front portion which is partially offset.

It is an object of the present invention to provide a tank and supporting structure, which, while being constructed of steel, weighs but little more than an aluminum truck of the same capacity. This and other objects will be apparent as the description progresses.

In the drawing:

Fig. 1 is a side elevation of a tank supporting structure and semitrailer frame members embodying the invention;

Fig. 2 is a sectional view taken on line 2—2 of Fig. 1;

Fig. 3 is a front view of the structure shown in Fig. 1, taken partly in section; and Fig. 4 shows the plate forming the step-up from the rear lower portion of the tank to the front offset portion.

The rear portion of the tank which is full oval in cross section, as shown in Fig. 2, is made up of three plates numbered 10, 11, and 12. Plates 10 and 11 form the sides and top of the tank body, and are joined together at the top by welds and a plurality of butt straps 13, which extend between the manholes 28. Plates 10 and 11 in turn are joined to the bottom sheet 12 by means of welds and butt straps 14 and 15 at the sides. Plates 10 and 11 are formed of 14 gauge, high tensile strength carbon steel plate, and plate 12 is of 12 gauge stock of the same material. This material has a tensile strength of 70,000 to 82,000 pounds per square inch. A tank of approximately 2800 gallon capacity made of this material in accordance with this invention would weigh about 4224 pounds, whereas a similar tank made from the usual steel plate, such plates being of sufficient thickness to withstand the stresses to which they would be subjected, would weigh about 6475 pounds.

The front offset portion of the tank is likewise made up of four separate sheets. The top and sides are formed from plates 16 and 17 joined together at the top by means of the butt straps 13. The bottom is formed from sheets 19 and 18 which are curved as shown in Fig. 3, and are joined together by a weld and butt strap 27, the outer edges of the sheet being turned downwardly with a rather large radius of curvature and welded to the sides 16 and 17. The sides 16 and 17 continue straight downwardly from the joint with the bottom plates 18 and 19 to form a skirting which partially conceals the bolsters supporting the tank. At their lower ends the sheets 16 and 17 are bent outwardly and then downwardly as shown in the drawing to provide a support to which further skirting may be welded or otherwise attached to screen the running gear and frame members.

The front of the tank is closed by means of a curved plate 20, this construction being used as it enables more tank room to be placed on the front end of the structure and yet permits the semitrailer to turn readily on the fifth wheel of the tractor (not shown without interfering with the cab structure on the tractor.

The rear portion of the tank and the front offset portion are connected by means of a curved plate 21, shown in Fig. 1 in place on the tank, and also shown in Fig. 4 as it appears when cut from a flat plate. Plate 21 is welded. as shown in Fig. 1, to plates 10, 11, and 12 forming the rear portion of the tank and to plates 18 and 19 forming the bottom of the front portion of the tank, the plates 19 and 18 being carried to a point considerably to the rear of the welded joint in order to form a splash plate within the offset portion of the tank and also to add strength to the tank at that particular point. The joint 22 between plates 10 and 17 and plates 16 and 11 is a plain butt welded joint with the weld ground down to the plane of the sheets.

The rear end of the tank is closed by means of a dished head 23 welded to the side and bottom sheets and similar dished heads 24 are placed at spaced intervals throughout the rear portion of the tank to form bulkheads separating the various compartments. The front offset portion of the tank contains two dished heads 25 forming bulkheads between the tank compartments in the front end of the structure.

Each of the tank compartments is provided with a manhole 28 and a bottom outlet opening 29, the fittings for which are not shown, since they do not form part of the present invention. A line 30 passes down through the center of the tank and is joined to a manifold system (not shown) for filling the tanks from the bottom to thereby avoid turbulence and subsequent evaporation of the gasoline while loading the tank, as shown and described in my prior Patent No. 1,906,996, issued May 2, 1933.

The rear portion of the tank is supported by means of bolsters 31 which are three in number and is supported in the front by three bolsters designated 32. These bolsters may be made up of thin sheet material welded together as shown in the drawing, and have relatively wide and well braced footpieces in order to adequately take up the thrust due to the starting and stopping of the truck. The bolsters are held to the frame members 37 by means of bolts 33 passing through plates 35 on the bottom of the frame members and tubes 34 and the bottom plate or footpiece of the bolster. The tank is welded to each of the bolsters at several points, 36, indicated on Fig. 2 and Fig. 1. The front portion of the tank is similarly welded to bolsters bolted to frame 37.

Each of the bolsters 31 extends beyond the critical stress point of the rear portion of the tank (indicated in Fig. 2) or that point which, if the loaded tank were rotated about its longitudinal axis, would be subjected to the greatest stress and the welds between the top sheets and the bottom sheet are also placed beyond the critical stress point. Due to this construction and due to the fact that the tank is welded at numerous points to each bolster, it is unnecessary to provide the usual straps passing around the periphery of the tank. By the use of such a construction, a tank having an exceptionally clean, neat appearance is obtained.

Having now described my invention, what I claim and desire to protect by letters patent is:

1. In a tank vehicle a rigid frame, a tank body of oval cross section, having a bottom plate with top wrapper plates welded thereto, bolsters welded to said bottom plate, and secured to said frame member, said bottom plate and said bolsters extending laterally beyond the critical stress point of said tank body, said bolsters being secured to said bottom plate beyond said critical stress point.

2. In a tank body for a semitrailer tank truck the combination comprising, a rear portion of oval cross section, an upwardly offset front portion whose sides and top are a continuation of the rear portion, a bottom for said upwardly offset front portion comprising a plate having a radius of curvature substantially greater than the radius of curvature of the bottom of the rear portion, and a forwardly bowed plate joining the bottom plate of the rear portion and the front upwardly offset portion said forwardly bowed plate joining the bottom of the upwardly offset front portion to a point forward of the rear end of said bottom plate substantially as shown and described.

3. In a tank vehicle, a tank body having an upwardly offset front portion, said tank body comprising a bottom plate, said bottom plate extending laterally beyond the critical stress point of said tank body, side plates welded at one edge to the edges of said bottom plate beyond said critical stress point, the other edges of said side plates being welded together to form the top of said tank body, a dished head welded to said bottom and side plates to form one end of said tank body, said offset front portion of said tank body comprising, bottom plates, side plates welded to said bottom plates and extending vertically therebelow, said side plates welded to each other to form the top of said tank, a curved plate secured to said bottom plates and side plates to form the front end of said tank body, a forwardly bowed step-up plate welded to the bottom and side plates of the main portion of said tank body and welded to the bottom plates of said offset front portion, the side plates of said main portion of the tank body being welded to the side plates of the front portion of said tank body, the bottom plates of said front portion extending beyond the said step-up plate and being secured to said side plates of the main portion of said tank body to strengthen the joint between the offset front portion and the main portion.

4. In a tank vehicle, a frame member having an upwardly offset front portion, a tank body of oval cross section having an upwardly offset front portion, said tank body comprising a bottom plate, said bottom plate extending laterally beyond the critical stress point of said tank body, side plates secured to said bottom plate beyond said critical stress point, said side plates being joined together to form the top of said tank, end plates secured to said bottom and side plates, said tank body being secured to said frame member by bolsters, conforming to the shape of said bottom plate and extending and being secured to said bottom plate beyond said critical stress point, a forwardly bowed plate securing the bottom plate and side plates of the main portion of said tank body to the bottom plates of said upwardly offset front portion, the bottom plate of said upwardly offset portion extending beyond said curved connection plate and forming a splash plate in said main portion of said tank, and secured to said side plates in said main portion of said tank body, the side plates in said front portion of said tank body extending vertically below said bottom plate to strengthen said tank body.

JOHN G. MOXEY.